(12) United States Patent
Fang (10) Patent No.: US 11,507,192 B2
(45) Date of Patent: Nov. 22, 2022

(54) GESTURE ACQUISITION SYSTEM

(71) Applicant: Chao Fang, Zhejiang (CN)

(72) Inventor: Chao Fang, Zhejiang (CN)

( * ) Notice: Subject to any disclaimer, the term of this patent is extended or adjusted under 35 U.S.C. 154(b) by 0 days.

(21) Appl. No.: 16/785,552

(22) Filed: Feb. 7, 2020

(65) Prior Publication Data

US 2020/0192487 A1    Jun. 18, 2020

Related U.S. Application Data

(63) Continuation of application No. PCT/CN2017/096362, filed on Aug. 8, 2017.

(51) Int. Cl.
| | | |
|---|---|---|
| *G06F 3/01* | (2006.01) | |
| *H04R 1/40* | (2006.01) | |
| *H04R 3/00* | (2006.01) | |

(52) U.S. Cl.
CPC ............. *G06F 3/017* (2013.01); *H04R 1/406* (2013.01); *H04R 3/005* (2013.01)

(58) Field of Classification Search
None
See application file for complete search history.

(56) References Cited

U.S. PATENT DOCUMENTS

| | | | | |
|---|---|---|---|---|
| 5,313,968 A | * | 5/1994 | Logan ................. | A61B 5/4528 600/595 |
| 6,104,379 A | * | 8/2000 | Petrich .................... | G06F 3/011 345/157 |
| 2009/0322673 A1 | * | 12/2009 | Cherradi El Fadili | G06F 3/017 345/157 |
| 2014/0098018 A1 | * | 4/2014 | Kim ........................ | G06F 3/014 345/156 |
| 2015/0101423 A1 | * | 4/2015 | Tuli ......................... | G06F 3/014 73/865.4 |
| 2016/0091980 A1 | * | 3/2016 | Baranski ............... | A61B 5/6824 345/156 |
| 2016/0299570 A1 | * | 10/2016 | Davydov ................ | G06F 3/167 |
| 2017/0123487 A1 | * | 5/2017 | Hazra ..................... | G06F 3/013 |
| 2017/0262064 A1 | * | 9/2017 | Ofir ......................... | A61B 5/00 |
| 2017/0315620 A1 | * | 11/2017 | Johri ....................... | G06V 40/28 |
| 2018/0311570 A1 | * | 11/2018 | Buchanan ............... | A63F 13/24 |
| 2018/0348853 A1 | * | 12/2018 | Shchur ................ | G06F 3/04883 |
| 2019/0033974 A1 | * | 1/2019 | Mu ......................... | G06F 3/011 |

FOREIGN PATENT DOCUMENTS

| | | |
|---|---|---|
| CN | 103793057 A | 5/2014 |
| CN | 104267807 A | 1/2015 |
| CN | 104856707 A | 8/2015 |

* cited by examiner

*Primary Examiner* — Amare Mengistu
*Assistant Examiner* — Sarvesh J Nadkarni (57) ABSTRACT

The present invention relates to a gesture acquisition system, comprising a finger posture acquisition device, the finger posture acquisition device comprising a main acquisition module which is located below a palm and synchronously swings with the palm, the main acquisition module being configured to acquire finger postures. In the gesture acquisition system, the main acquisition module of the finger posture acquisition device is arranged below a palm. In this way, the angle of view and the position of the main acquisition module are fixed relative to the palm. Thus, for a same gesture, it is recognized by images captured from a fixed angle. The recognition time is reduced, the recognition accuracy is improved, and the computation for background deletion is eliminated.

15 Claims, 7 Drawing Sheets

GESTURE ACQUISITION SYSTEM

TECHNICAL FIELD

The present invention relates to the technical field of human-machine interaction (HMI in short) and in particular to a gesture acquisition system.

BACKGROUND OF THE PRESENT INVENTION

With the development of science and technology, the application of various smart devices is increasingly widespread. Human-machine interaction between human beings and smart devices is increasing. There are two types of human-machine interaction: contact or non-contact. Contact man-machine interaction is more mature and complete. Non-contact man-machine interaction is still at the starting stage.

As an intuitive and natural interaction way, gesture is an important means for human beings to exchange information with each other due to its quick expression and rich meaning. In the prior art, the gesture acquisition sensor is arranged statically in the third person of view or on the helmet or glasses. As a result, the coverage of the image sensor is limited so that the hand may not be captured by occlusion; the captured image contains the background where a person stays; the resolution of the hand is low when the hand is far away from the sensor, and the hand may be shielded by other objects; and for a same gesture, image obtained from different angles greatly varies. Therefore, in the gesture recognition process, recognition is started only after tracking, focusing, image segmentation for background deletion, resizing & cropping, and manifold processing. Due to the high cost of power consumption for recognition and illumination and image sensors, there is no real-time, contactless and precise wearable device for gesture recognition.

SUMMARY OF THE PRESENT INVENTION

An objective of the present invention is to provide a gesture acquisition system that can acquire finger posture information accurately with less recognition time, less computation cost, low power consumption and non-contact and wearable property, and all of the above disadvantages are avoided.

For this purpose, the present invention employs the following technical solutions. A gesture acquisition system is provided, comprising a finger posture acquisition device, the finger posture acquisition device comprising a main acquisition module which is located below a palm and can synchronously swing with the palm, the main acquisition module being configured to acquire finger postures.

Further, the gesture acquisition system further comprises a wrist posture acquisition device configured to acquire adduction-abduction postures of a wrist and flexion-extension postures of the wrist and a wristband fixed on the forearm, the wrist posture acquisition device comprising a wrist posture acquisition arm that does an adduction-abduction motion and a flexion-extension motion together with the wrist and a sensing module configured to acquire a flexion-extension angle and an adduction-abduction angle of the wrist posture acquisition arm, and the wrist posture acquisition arm being connected to the wristband.

Further, the gesture acquisition system further comprises a wristband tied around the wrist, the wrist posture acquisition arm being connected to the wristband, and the wrist posture acquisition arm doing an adduction-abduction motion and a flexion-extension motion together with the wrist by the wristband.

Further, the wrist posture acquisition arm comprises an adduction-abduction arm that does an adduction-abduction motion together with the wrist and a flexion-extension arm that does a flexion-extension motion together with the wrist; and the sensing module comprises two angle sensors that are, respectively, an adduction-abduction angle sensor configured to acquire an adduction-abduction angle of the adduction-abduction arm and a flexion-extension angle sensor configured to acquire a flexion-extension angle of the flexion-extension arm.

Further, the wristband and an adduction-abduction axis of the wrist during the adduction-abduction motion have two points of intersection which are corresponding to the adduction-abduction arm, and the wristband and an flexion-extension axis of the wrist during flexion-extension motion have two points of intersection which are corresponding to the flexion-extension arm; each of the adduction-abduction arm and the flexion-extension arm has a position fixed end and a free end opposite to the position fixed end; the position fixed end of one of the adduction-abduction arm and the flexion-extension arm is mounted on the wristband and located at one of two corresponding points of intersection, with a corresponding angle sensor being mounted there, the flexion-extension angle sensor being configured to sense rotation angle on the flexion-extension axis and the adduction-abduction angle sensor being configured to sense the rotation angle on the adduction-abduction axis, and the free end thereof is wound, along the wristband, to one of two points of intersection corresponding to the other one of the adduction-abduction arm and the flexion-extension arm and connected to the fixed end of the other one of the adduction-abduction arm and the flexion-extension arm; a join point of the adduction-abduction arm and the flexion-extension arm has an included angle, with the other angle sensor being mounted there; the free end of the other one of the adduction-abduction arm and the flexion-extension arm is arranged around the wristband and extended toward an outer side of the wristband to be fixed on the wrist at a position adjacent to the hand.

Further, the flexion-extension angle sensor is arranged along the flexion-extension axis and the adduction-abduction angle sensor is arranged along the adduction-abduction axis.

Further, the free end, located on the wrist at a position adjacent to the hand, of the adduction-abduction arm and the flexion-extension arm is wound to the bottom of the wrist at a position adjacent to the hand, with the main acquisition module being mounted there.

The wrist posture acquisition arm is a telescopic pole; the wrist posture acquisition arm is connected to the wristband and comprises one end located above or lateral to the wristband and another end fixedly connected to the hand; the wrist posture acquisition arm and the wristband has a point of intersection located between one end and the another end; either or both end is able to swing around the point of intersection; and the sensing module acquires the flexion-extension angle and the adduction-abduction angle of the wrist posture acquisition arm by acquiring swing information of that end.

Further, fisheye bearings are arranged on the wristband and (or) fixation structure, and the wrist posture acquisition arm is connected to the wristband and (or) fixation structure by running through the fisheye bearing.

Further, the sensing module is a Hall sensor, a magnet is arranged at the both or either end of the wrist posture acquisition arm; and the sensing module acquires the flexion-extension angle and the adduction-abduction angle of the wrist posture acquisition arm by acquiring magnetic field information at the both or either end.

Further, the sensing module is located in either or both extension directions of the wrist posture acquisition arm and is farther from the one end of the wrist posture acquisition arm than the another end of the wrist posture acquisition arm.

Further, the gesture acquisition system further comprises a fixation structure that is fixed on the wrist at a position adjacent to the hand, the one end of the wrist posture acquisition arm being mounted on the fixation structure, and the main acquisition module being fixed on the fixation structure or the wrist posture acquisition arm.

Further, the gesture acquisition system further comprises a forearm posture acquisition device mounted on the wristband, the forearm posture acquisition device being configured to acquire forearm postures. The forearm posture acquisition device comprises a three-axis gyroscope, a three-axis magnetometer and a three-axis acceleration sensor.

Further, the wristband is shaped in a sleeve; a first fixation portion and a second fixation portion are arranged on the wristband at interval; and the first fixation portion and the second fixation portion are matched with parts, protruded on the body skin, of styloid process of radius and styloid process of ulna to fixedly mount the wristband on the wrist, respectively.

Further, the first fixation portion and the second fixation portion are through-holes or grooves formed on the wristband.

Further, the gesture acquisition system further comprises an ambient information acquisition device configured to search for, in the ambient environment, electronic devices to be controlled.

Further, the gesture acquisition system further comprises a processor connected to other electronic elements in the gesture acquisition system.

Further, the main acquisition module is camera.

Further, the auxiliary acquisition module is camera and microphone (microphone arrays) or the auxiliary acquisition module is microphone or microphone arrays.

Further, the main acquisition module is mounted within 0-5 cm from the wrist joint to fingers and 0-3 cm from the wrist to a person's arm, and 0-3 cm away from the body skin.

Further, the auxiliary acquisition module is camera, which could provide position and orientation data of forearm.

With the technical solutions, the present invention has the following beneficial effects.

In the gesture acquisition system of the present invention, the main acquisition module of the finger posture acquisition device is arranged below a palm and could synchronously swings with the palm. In this way, the angle of view and the position of the main acquisition module are fixed relative to the palm. Thus, for a same gesture, it is recognized by images captured from one fixed direction. The manifold processing time is reduced, the failure in gesture recognition because of occlusion is avoided, and the computations for tracking, segmentation and size scaling are saved. In addition, the defect that it is unable to perform gesture operations for a long period of time is eliminated. Meanwhile, the range of illumination is reduced and the power consumption for illumination is also reduced.

DETAILED DESCRIPTION OF THE PRESENT INVENTION

In order to make the objectives, technical solutions and advantages of the present invention clearer, the present invention will be further described below in detail with reference to the accompanying drawings by embodiments. It should be understood that the specific embodiments to be described herein are merely used to explain the present invention, rather than limiting the present invention.

Figure 1:
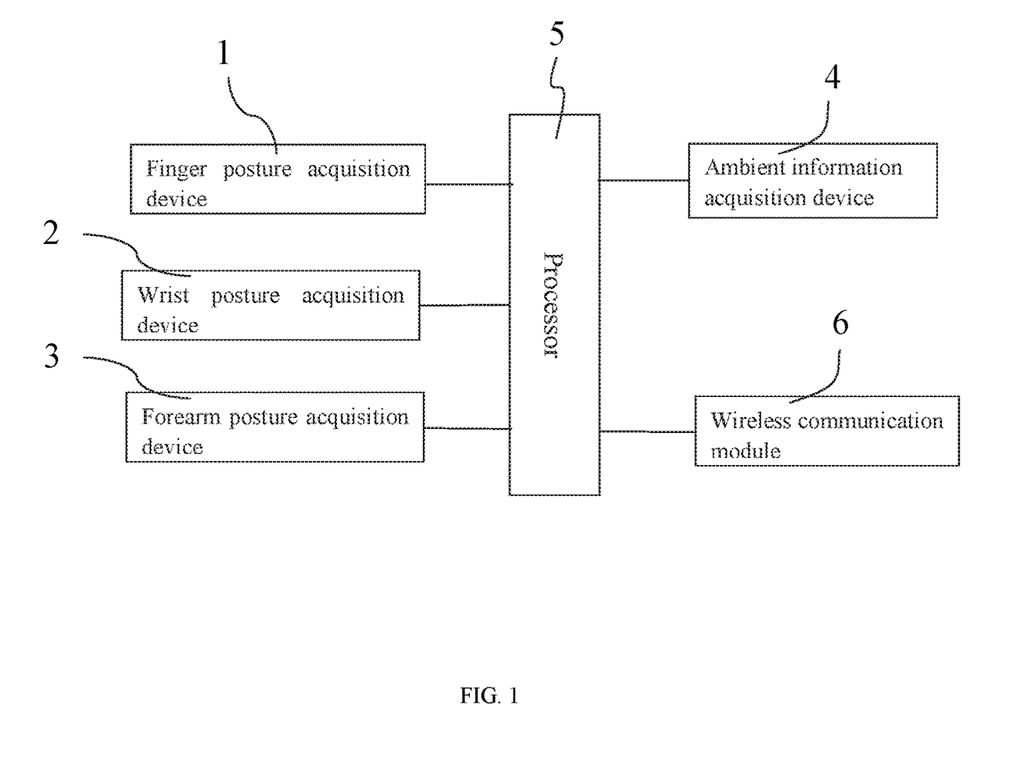
FIG. 1 is a circuit block diagram of a gesture acquisition system according to the present invention.

Referring to FIG. 1, an embodiment of the present invention provides a gesture acquisition system, comprising a finger posture acquisition device 1. The finger posture acquisition device 1 comprises a main acquisition module 11 which is located below a palm and synchronously swings with the palm, and an auxiliary acquisition module (not shown). The main acquisition module 11 may be configured to acquire finger postures. The main acquisition module 11 may be, for example, cameras or depth camera or other image sensors like ultra-sound image sensor. The main acquisition module 11 acquires finger posture information by acquiring an image of a finger and part of palm. The auxiliary acquisition module is also configured to assist in acquiring finger posture information. The auxiliary acquisition module may be located on the hand at any position where finger postures can be acquired, to assist in acquiring finger posture information. The auxiliary acquisition module may be, for example, a camera that acquires finger posture information by acquiring an image of a finger or acquires the position and orientation of the hand or arm in the space with simultaneous localization and mapping (SLAM) algorithm and inverse kinematic or forward kinematic (IK/FK) algorithm. The main and auxiliary acquisition module may comprise, for another example, microphones that acquire sound of fingers' action when tapping or snapping. It may be understood that, in human-machine interaction, in addition to finger postures, wrist postures and forearm postures are to be acquired by the gesture acquisition system.

To acquire wrist postures, the gesture acquisition system in the present invention further comprises, for example, a wrist posture acquisition device 2 configured to acquire adduction-abduction posture information of the wrist and flexion-extension posture information of the wrist. In the present invention, by acquiring adduction-abduction posture information of the wrist and flexion-extension posture information of the wrist by the wrist posture acquisition device 2, wrist postures are acquired. It is to be noted that, anatomically, whiling opening your palm, the swing of the wrist around an axis perpendicular to the palm is called the adduction-abduction motion of the wrist, and the swing of the wrist along the axis perpendicular to the palm is called the flexion-extension motion of the wrist. The wrist posture acquisition device 2 in the present invention can acquire an adduction-abduction motion and a flexion-extension motion of the wrist so as to acquire the adduction-abduction posture information of the wrist and flexion-extension posture information of the wrist.

Referring to FIGS. 2-6, in this embodiment, the wrist posture acquisition device 2 comprises a wrist posture acquisition arm 22 that does an adduction-abduction motion and a flexion-extension motion together with the wrist and a sensing module 24 configured to acquire the flexion-extension angle and the adduction-abduction angle of the wrist posture acquisition arm 22. Thus, the wrist posture information is acquired. To ensure that the wrist posture acquisition arm 22 can do an adduction-abduction motion and a flexion-extension motion together with the wrist and that the sensing module 24 can acquire the flexion-extension angle and the adduction-abduction angle of the wrist posture acquisition arm 22 accurately, the wrist posture acquisition arm 22 is usually made of hard material. In this way, the wrist posture acquisition arm 22 is less likely to deform. The decreasing of accuracy affected by the easy deformation of the wrist posture acquisition arm 22 can be avoided. To acquire forearm posture information, the gesture acquisition system in the present invention further comprises, for example, a forearm posture acquisition device 3 configured to acquire forearm posture information. In this embodiment, the forearm posture acquisition device 3 comprises a three-axis gyroscope, a three-axis magnetometer and a three-axis acceleration sensor, wherein the three-axis gyroscope is configured to detect the three-axis angular velocity of the forearm, the three-axis acceleration sensor is configured to detect the three-axis acceleration of the forearm, the three-axis magnetometer is configured to detect the three-axis magnetism of the state of the forearm. With the arrangement of them, the detected forearm posture information is more accurate.

The gesture acquisition system in the present invention can also determine electronic devices to be controlled. The gesture acquisition system in the present invention further comprises, for example, an ambient information acquisition device 4 configured to search for, in the ambient environment, electronic devices (computers, tablets, household appliances, IOTs, on-vehicle devices, etc.) to be controlled in interaction and to locate a person's arm relative to the indoor or outdoor local ambient environment. In this embodiment, the ambient information acquisition device 4 is an ambient information camera. Of course, the forearm posture acquisition device 3 further comprises a light reflecting point arranged on the wristband. The ambient information acquisition device 4 can acquire information about the position of the light reflecting point.

To ease of human-machine interaction, the gesture acquisition system in the present invention further comprises a processor 5 and a wireless communication module 6. The finger posture acquisition device 1, the wrist posture acquisition device 2, the forearm posture acquisition device 3, the ambient information acquisition device 4 and the wireless communication module 6 are all connected to the processor 5. The finger posture information acquired by the finger posture acquisition device 1, the wrist posture information acquired by the wrist posture acquisition device 2, the forearm posture information acquired by the forearm posture acquisition device 3, the electronic devices to be controlled which are searched by the ambient information acquisition device 4, and space information of the forearm are all sent to the processor 5. The processor 5 determines the electronic devices to be controlled and calculates spatial coordinates of the forearm according to those information, and outputs corresponding operating instructions according to those information, which operating instructions are sent to the electronic devices to be controlled via the wireless communication module 6. In this way, human-machine interaction with the electronic devices to be controlled is realized. That is, electronic devices can be controlled by gestures.

Figure 5:
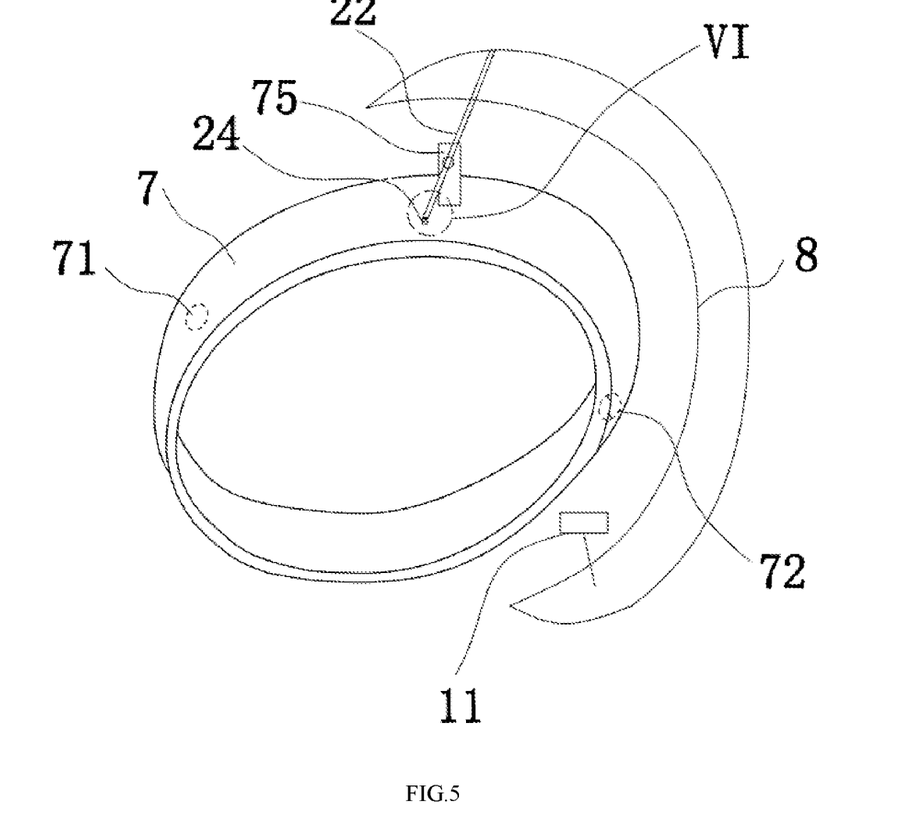
FIG. 5 is a stereoscopic structure diagram of a second embodiment of the gesture acquisition system according to embodiments of the present invention.
Figure 6:
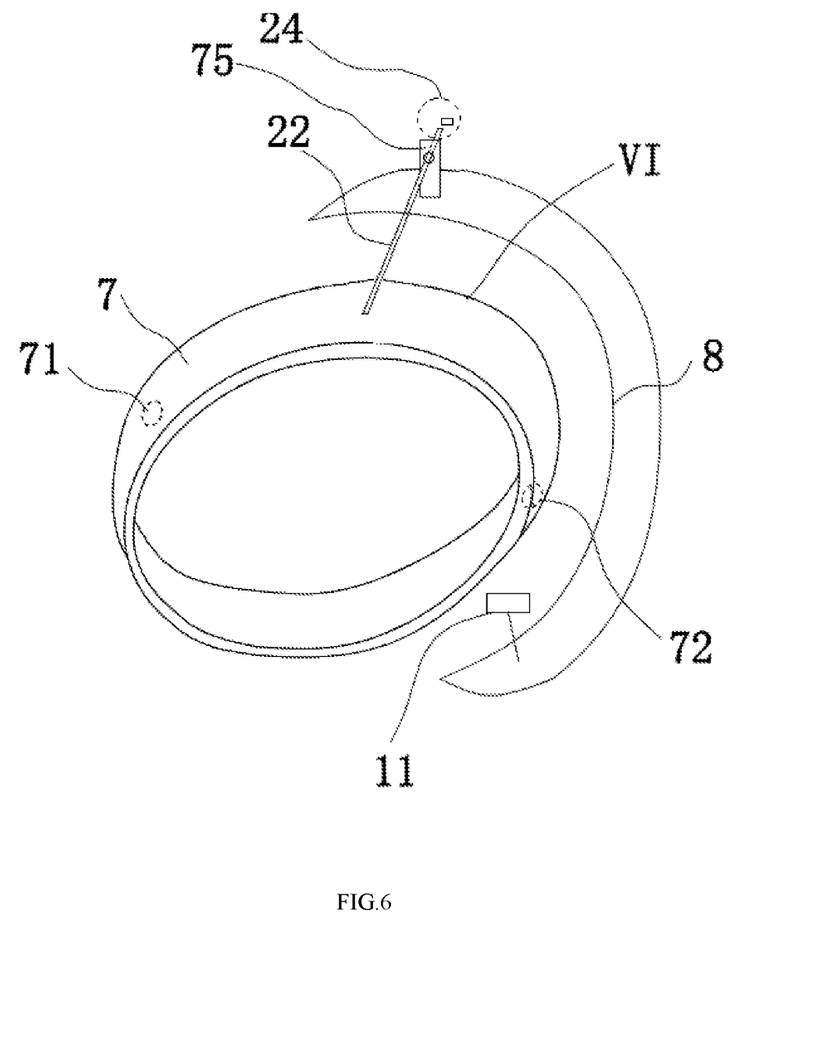
FIG. 6 is a stereoscopic structure diagram of a second embodiment of the gesture acquisition system according to embodiments of the present invention.

Referring to FIGS. 5&6, the gesture acquisition system in the present invention further comprises a wristband 7 tied around the wrist. The main acquisition module 11, the wrist posture acquisition device 2, the forearm posture acquisition device 3, the ambient information acquisition device 4, the wireless communication module 6 and the processor 5 may be, for example, all connected to the wristband 7. As used herein, "connected to the wristband 7" includes "connected to the wristband 7 directly" and "connected to the wristband 7 indirectly, i.e., by an element, for example, a connecting rod or the like". The arrangement of the wristband 7 is to conveniently realize the synchronous swing of the main acquisition module 11 with the palm. The wrist posture acquisition arm 22 of the wrist posture acquisition device 2 moves together with the wrist rotation. The way of connecting the main acquisition module 11 and the wrist posture acquisition device 2 to the wristband 7 will be described below in details.

Of course, in other embodiments, the wristband 7 may be omitted, and the main acquisition module 11 may be fixed below the palm by a sucker or in other ways. The wrist posture acquisition device 2 may be arranged on the wrist by a sucker. The forearm posture acquisition device 3, the ambient information acquisition device 4, the wireless communication module 6 and the processor 5 may be fixed on a person's arm, or connected to a person's arm by structures such as connecting rods and located on an outer side of the arm. The way of mounting the forearm posture acquisition device 3, the ambient information acquisition device 4, the wireless communication module 6 and the processor 5 is not limited thereto, as long as the corresponding signal acquisition, transmission and processing can be realized.

In this embodiment, the wristband 7 is shaped in a sleeve; a first fixation portion 71 and a second fixation portion 72 are arranged on the wristband 7 at interval; and the first fixation portion 71 and the second fixation portion 72 are matched with parts, protruded on the body skin, of styloid process of radius and styloid process of ulna to fixedly mount the wristband 7 on the wrist, respectively, in order to prevent the wristband 7 from falling off or sliding at the wrist. Specifically, the first fixation portion 71 and the second fixation portion 72 are through-holes or grooves formed on the wristband 7. In this way, styloid process of radius and styloid process of ulna can be received in the through-holes or grooves, so that the wristband 7 is fixed on the wrist. It is to be noted that, as shown, the description is given by taking a wristband to be worn on the right hand as an example, with the right hand palm facing down, and fingers being perpendicular to and pointing to paper. It may be understood that a wristband to be worn on the left hand is structurally the same as the wristband to be worn on the right hand, except that the first fixation portion (71) and the second fixation portion (72) need to be formed correspondingly to parts, protruded on the body skin, of styloid process of radius on the left hand and styloid process of ulna on the left hand, respectively.

Figure 2:
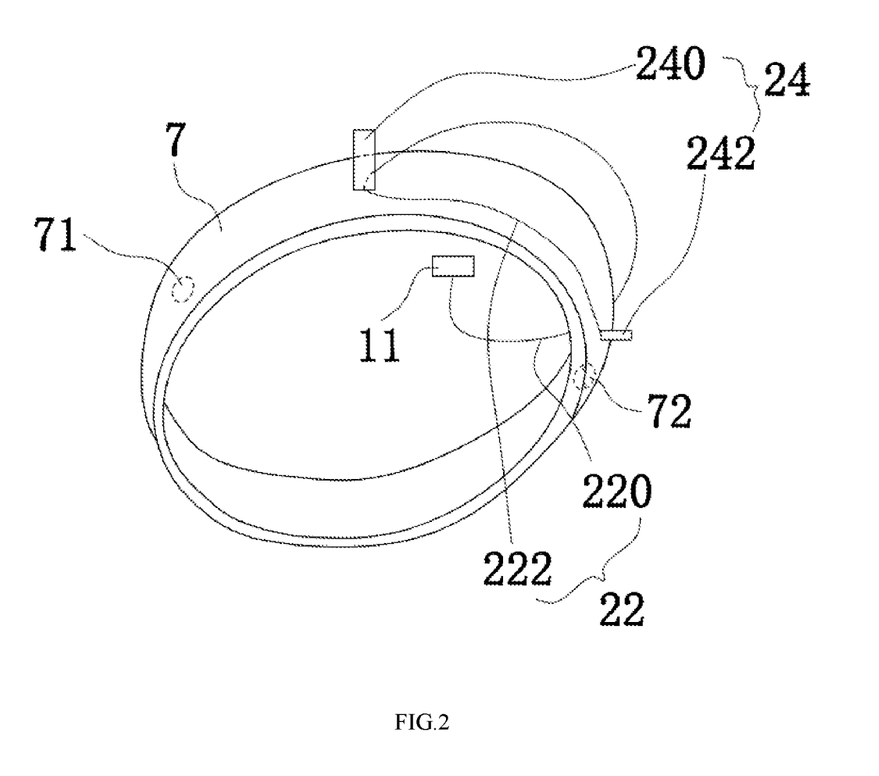
FIG. 2 is a stereoscopic structure diagram of a first embodiment of the gesture acquisition system according to embodiments of the present invention.

Specifically, referring to FIG. 2, a stereoscopic structure diagram of a first embodiment of the gesture acquisition system according to the present invention is shown. In this embodiment, the wrist posture acquisition arm 22 comprises an adduction-abduction arm 220 that does an adduction-abduction motion together with the wrist and a flexion-extension arm 222 that does a flexion-extension motion together with the wrist; and the sensing module 24 comprises two angle sensors that are, respectively, an adduction-abduction angle sensor 240 configured to acquire an adduction-abduction angle of the adduction-abduction arm 220 and a flexion-extension angle sensor 242 configured to acquire a flexion-extension angle of the flexion-extension arm 222. In this embodiment, the adduction-abduction angle of the adduction-abduction arm 220 together with the adduction-abduction motion of the wrist is acquired by the adduction-abduction arm 220, and the flexion-extension angle of the flexion-extension arm 222 together with the flexion-extension motion of the wrist is acquired by the flexion-extension angle sensor 242. In this way, the adduction-abduction angle and the flexion-extension angle of the wrist are acquired accurately. Thus, the wrist postures are acquired.

Further, after the wristband 7 is worn on the wrist, the wristband 7 and an adduction-abduction motion axis of the wrist during adduction-abduction motion have two points of intersection which are corresponding to the one end of adduction-abduction arm 220, and the wristband 7 and an flexion-extension axis of the wrist during flexion-extension have two points of intersection which are corresponding to the one end of flexion-extension arm 222. The adduction-abduction arm 220 has a position fixed end and a free end opposite to the position fixed end. The orientation of the position fixed end can be changed. The flexion-extension arm 222 also has a position fixed end and a free end opposite to the position fixed end, wherein the position fixed end of one of the adduction-abduction arm 220 and the flexion-extension arm 222 is mounted on the wristband 7 and located at one of two corresponding points of intersection, with a corresponding angle sensor being mounted there, and the free end thereof is wound, along the wristband 7, to one of two points of intersection corresponding to the other one of the adduction-abduction arm 220 and the flexion-extension arm 222 and connected to the position fixed end of the other one of the adduction-abduction arm 220 and the flexion-extension arm 222; a join point of the adduction-abduction arm 220 and the flexion-extension arm 222 has an included angle, with the other angle sensor being mounted there; the free end of the other one of the adduction-abduction arm 220 and the flexion-extension arm 222 is arranged around the wristband 7 and extended toward an outer side of the wristband 7 to be fixed on the wrist at a position adjacent to the hand. In this embodiment, the free end is fixed on the hand at a position adjacent to the wrist, by clamping the acquisition arm to the hand at a position adjacent to the wrist. In this way, when the wrist does a flexion-extension motion, the flexion-extension arm 222 will do a flexion-extension motion together with the wrist, and the flexion-extension angle sensor 242 can sense the change in the angle of the flexion-extension arm 222 and thus the flexion-extension postures of the wrist. When the wrist does an adduction-abduction motion, the adduction-abduction arm 220 will do an adduction-abduction motion together with the wrist, and the adduction-abduction angle sensor can sense the change in the angle of the adduction-abduction arm 220 and thus the adduction-abduction postures of the wrist.

In this embodiment, the free end, located on the wrist at a position adjacent to the hand, of the adduction-abduction arm 220 or the flexion-extension arm 222 is wound to the bottom of the wrist at a position adjacent to the hand, with the main acquisition module 11 being mounted there, in order to ensure that the main acquisition module 11 can swing with the palm. Of course, in other embodiments, a connecting rod may be extended from the wristband 7 to be located below the palm, and the main acquisition module 11 is mounted on the connecting rod.

To ensure the accuracy of the acquired angle information, the flexion-extension angle sensor 242 is arranged along the flexion-extension axis and the adduction-abduction angle sensor 240 is arranged along the adduction-abduction axis. That is, both the flexion-extension angle sensor 242 and the adduction-abduction angle sensor 240 are perpendicular to the tangent of the corresponding point of intersection.

Figure 3:
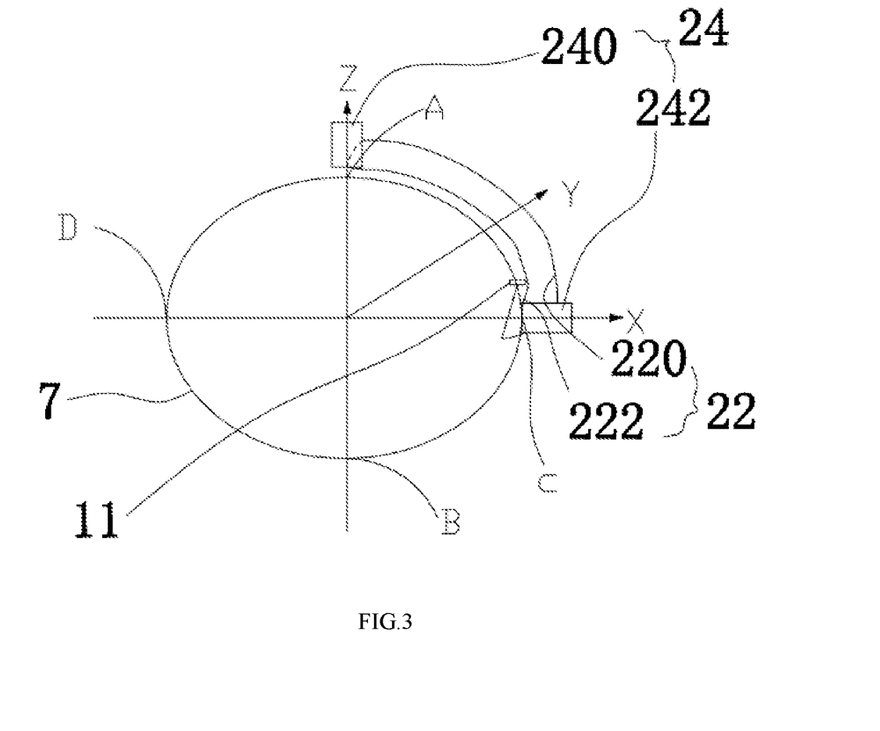
FIG. 3 is a schematic view of FIG. 2.

Specifically, in this embodiment, as shown in FIG. 3, in the three-dimensional coordinate system, X is the flexion-extension axis, Z is the adduction-abduction axis, and Y is the axial direction of the wristband 7. In the specific arrangement, the wristband 7 and the adduction-abduction axis have two points of intersection A and B, while the wristband 7 and the flexion-extension axis have two points of intersection C and D. One end of the flexion-extension arm 222 is mounted at any one of points of intersection of the wristband 7 and the flexion-extension axis, for example, point of intersection C. The flexion-extension angle sensor 242 is connected to the position fixed end of the flexion-extension arm 222 and arranged on the X-axis. The free end of the flexion-extension arm 222 is arranged around the wristband 7, and wound to the point A; then, the position fixed end of the adduction-abduction arm 220 is connected to the free end of the flexion-extension arm 222; and the free end of the adduction-abduction arm 220 is wound to the outer side of the wristband 7 and fixed on the hand at a position adjacent to the wrist. Specifically, the free end of the adduction-abduction arm 220 is extended to the outer side of the wristband 7 while being wound toward the point of intersection C, and then wound toward the hand at a position adjacent to the wrist to be located on the outer side of the wristband 7 and fixed on the hand at a position adjacent to the wrist. Here, the free end of the adduction-abduction arm 220 is fixed on the hand at a position adjacent to the wrist, by clamping the adduction-abduction arm 220 on the hand at a position adjacent to the wrist. In this way, when the wrist does a flexion-extension motion, the flexion-extension arm 222 swings, surrounding the wristband 7, around the flexion-extension axis of the wrist joint, and the flexion-extension angle sensor 242 rotates together with the flexion-extension arm 222, so that the flexion-extension angle sensor 242 acquires the swing angle of the flexion-extension arm 222 so as to acquire the flexion-extension postures of the wrist. In this case, the adduction-abduction arm 220 will not swing around the flexion-extension axis and the adduction-abduction angle sensor 240 will not acquire the flexion-extension angle of the flexion-extension arm 222. When the wrist does an adduction-abduction motion, the adduction-abduction arm 220 is fixed on the hand adjacent to the wrist and thus swings around the adduction-abduction axis together with the wrist, the angle between the flexion-extension arm 222 and the adduction-abduction arm 220 changes as the adduction-abduction arm 220 swings, and the adduction-abduction angle sensor 240 acquires the swing angle of the adduction-abduction arm 220 so as to acquire the adduction-abduction postures of the wrist. In this case, the flexion-extension arm 222 will not swing around the adduction-abduction axis and the adduction-abduction angle sensor 242 will not acquire the flexion-extension angle of the adduction-abduction arm 220.

To mount the main acquisition module 11 conveniently, the free end of the adduction-abduction arm 220 may be wound to the bottom of the hand at a position adjacent to the wrist and then extended toward the palm. The main acquisition module 11 is mounted at the free end of the adduction-abduction arm 220 to ensure that the main acquisition module 11 synchronously swings together with the palm.

Figure 4:
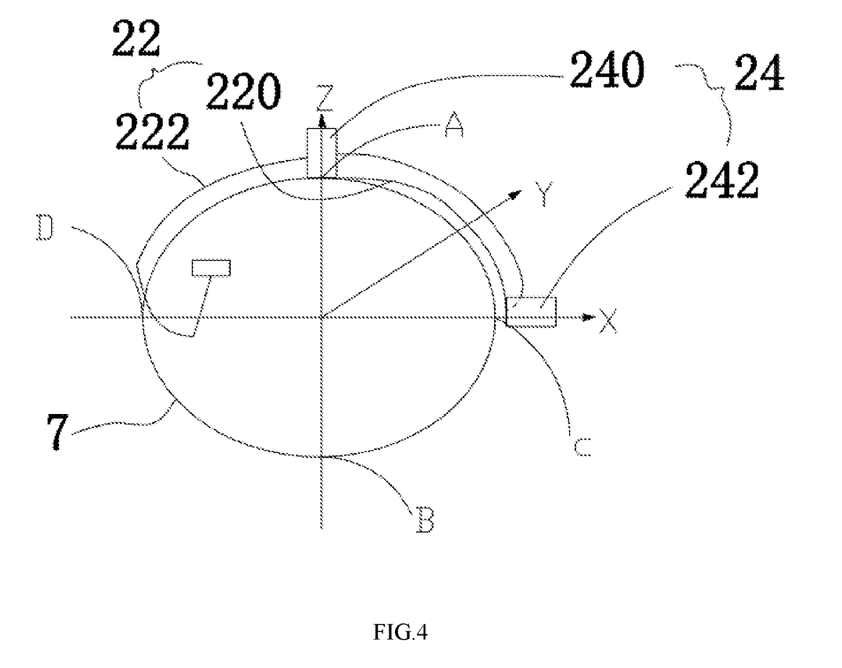
FIG. 4 is a schematic view of another implementation of the present invention.

In another embodiment, as shown in FIG. 4, X is the flexion-extension axis, Z is the adduction-abduction axis, and Y is the axial direction of the wristband 7. In the specific arrangement, in this embodiment, the position fixed end of the adduction-abduction arm 220 is mounted at any one of points of intersection of the wristband 7 and the adduction-abduction axis, for example, point of intersection A. The adduction-abduction angle sensor 240 is fixed at the fixed end of the adduction-abduction arm 220 and arranged along the Z-axis. The free end of the adduction-abduction arm 220 is arranged around the wristband 7, and then wound to, for example, the point C. The fixed end of the flexion-extension arm 222 is connected to the free end of the adduction-abduction arm 220. The flexion-extension angle sensor 242 is mounted at the join point of the flexion-extension arm 222 and the adduction-abduction arm 220. The flexion-extension angle sensor 242 is arranged along the X-axis. The free end of the flexion-extension arm 222 is wound to the outer side of the wristband 7 and fixed on the hand at a position adjacent to the wrist. Specifically, the free end of the flexion-extension arm 222 is wound toward the point of intersection A and then toward the point of intersection D and extended to the outer side of the wristband 7 while being wound, and then wound toward the hand at a position adjacent to the wrist to be located on the outer side of the wristband 7 and fixed on the hand at a position adjacent to the wrist. Here, the free end of the flexion-extension arm 222 is fixed on the hand at a position adjacent to the wrist, by clamping the flexion-extension arm 222 on the hand at a position adjacent to the wrist. In this way, when the wrist does a flexion-extension motion, the flexion-extension arm 222 is fixed on the hand adjacent to the wrist and thus swings around the flexion-extension axis together with the wrist, the angle between the flexion-extension arm 222 and the adduction-abduction arm 220 changes, and the flexion-extension angle sensor 242 thus acquires the swing angle of the flexion-extension arm 222 so as to acquire the flexion-extension postures of the wrist. In this case, the adduction-abduction arm 220 will not swing around the flexion-extension axis and the adduction-abduction angle sensor 240 will not acquire the flexion-extension angle of the flexion-extension arm 222. When the wrist does an adduction-abduction motion, the adduction-abduction arm 220 swings, by the wristband 7, around the adduction-abduction axis together with the wrist, and the adduction-abduction angle sensor 240 swings together with the adduction-abduction axis, so that the adduction-abduction angle sensor 240 acquires the swing angle of the adduction-abduction arm 220 so as to acquire the adduction-abduction postures of the wrist. In this case, the flexion-extension arm 222 will not swing around the adduction-abduction axis and the flexion-extension angle sensor 242 will not acquire the adduction-abduction angle of the adduction-abduction arm 220.

To mount the main acquisition module 11 conveniently, the free end of the flexion-extension arm 222 may be wound to the bottom of the hand at a position adjacent to the wrist and then extended toward the palm. The main acquisition module 11 is mounted at the free end of the flexion-extension arm 222 to ensure that the main acquisition module 11 synchronously swings together with the palm.

Referring to FIGS. 5 & 6, a stereoscopic structure diagram of a second embodiment of the gesture acquisition system according to the present invention is shown. In this embodiment, the wrist posture acquisition arm 22 is a telescopic pole; the wrist posture acquisition arm 22 is connected to the wristband 7 or fixation structure 8 and comprises one end located above, lateral to or below the wristband 7 or fixation structure 8 and another end fixedly connected to the wrist adjacent to the hand; the wrist posture acquisition arm 22 and the wristband 7 has a point of intersection located between the two ends; one end of the wrist posture acquisition arm 22 is able to swing around the point of intersection; and the sensing module 24 acquires the flexion-extension angle and the adduction-abduction angle of the wrist posture acquisition arm 22 by acquiring swing information of the end.

Specifically, in this embodiment, a fisheye bearing 75 is arranged on the wristband 7 (FIG. 5) and (or) the fixation structure 8 (see FIG. 6), and the wrist posture acquisition arm 22 is connected to the wristband 7 and (or) the fixation structure 8, by running through the fisheye bearing 75. Both the structure and the operating principle of the fisheye bearing 75 are well-known and will not be repeated here. The wrist posture acquisition arm 22 can swing together with the wrist by the fisheye bearing 75 arranged on the wristband 7 (FIG. 5) or the fixation structure 8 (see FIG. 6) or on both. Specifically, the part, between the fisheye bearing 75 and the another end of the wrist posture acquisition arm 22, extends or retracts, depending upon actual requirements. The one end of the wrist posture acquisition arm 22 swings together with the wrist by the fisheye bearing 75. The sensing module 24 can acquire the posture of the wrist by acquiring the swing information of the one or two ends. More specifically, when the wrist does an adduction-abduction motion, the one or two ends of the wrist posture acquisition arm 22 swings laterally together with the wrist by the fisheye bearing 75, and the sensing module 24 acquires the adduction-abduction posture information of the wrist by acquiring the lateral swing angle of the one end. When the wrist does a flexion-extension motion, one or two end of the wrist posture acquisition arm 22 swings vertically together with the wrist by the fisheye bearing 75, and the sensing module 24 acquires the flexion-extension posture information of the wrist by acquiring the vertical swing angle of the one or two ends.

Figure 7:
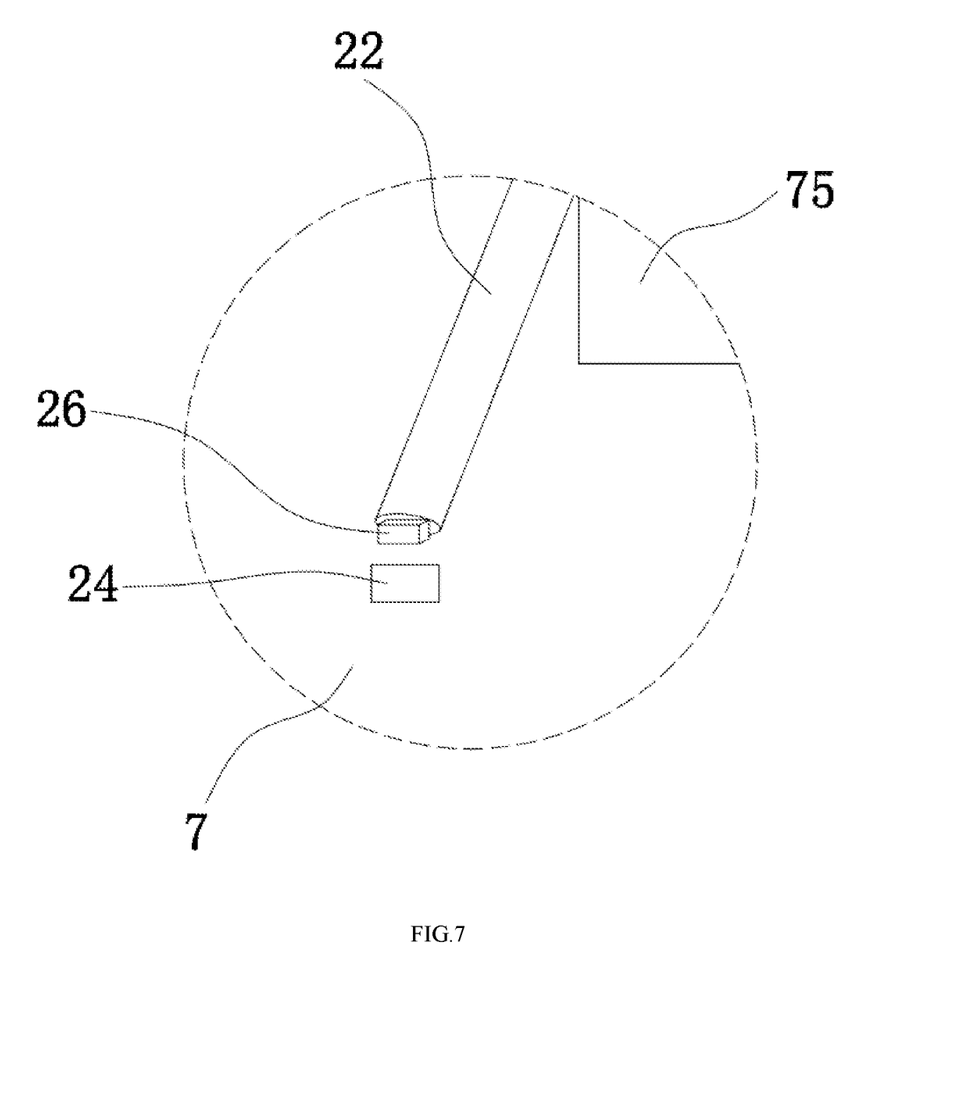
FIG. 7 is an enlarged view of part VI of FIG. 5 and FIG. 6.

In this embodiment, referring to FIG. 7, the sensing module 24 is a Hall sensor. A magnet 26 is arranged at the one end of the wrist posture acquisition arm 22. The magnet 26 forms a magnetic field in vicinity of this end of the wrist posture acquisition arm 22. The Hall sensor senses the magnetic field formed by the magnet 26. The Hall sensor can sense the change in the magnetic field, which is caused by the swing of the one end of the wrist posture acquisition arm 22. Therefore, the sensing module 24 acquires the up-down swing angle and left-right swing angle of the one or two ends of the wrist posture acquisition arm 22 and thus acquires the flexion-extension angle and the adduction-abduction angle of the wrist, by acquiring magnetic field information at the end of the wrist posture acquisition arm 22.

In this embodiment, the sensing module 24 is located in an extension direction of the wrist posture acquisition arm 22 and is farther from the another end of the wrist posture acquisition arm 22, so that the sensing module 24 can acquire the magnetic field information at the one or two ends of the wrist posture acquisition arm 22 accurately.

In this embodiment, the gesture acquisition system in the present invention further comprises a fixation structure 8 that is C-shaped. Specifically, the fixation structure 8 may be formed by bending a hard plastic board. The fixation structure 8 is fixed on the wrist at a position adjacent to the hand, for example, fixed by clamping. The fixation structure 8 is closer to the hand than the wristband 7. The another end of the wrist posture acquisition arm 22 is fixed on the fixation structure 8, and the main acquisition module 11 is fixed on the fixation structure 8. To locate the main acquisition module 11 below the palm, a connecting rod is extended from the fixation structure 8 to be located below the palm, for example in a direction to fingers, and the main acquisition module 11 is fixed on the connecting rod.

In the above description, the main acquisition module 11 is mounted within 0-5 cm from the wrist joint to fingers and 0-3 cm from the wrist to a person's arm, and 0-3 cm, preferably 0-2 cm, away from the body skin. The arrangement of the main acquisition module 11 in this region can realize the accurate acquisition of the finger posture information with minimum FOV of camera. Compared with the prior art, the gesture acquisition system of the present invention has the following advantages:

1. The Cost is Reduced.

Traditional gesture recognition devices capture hand images from other perspectives or external environments to recognize gestures. By such methods, each device to be controlled needs to be equipped with a recognition device (keyboard, mouse, touching pad). For example, there are 20 devices to be controlled (pads, computers, TVs, mobile phones, other IOT devices such as smart household appliances) in the home, and each device requires a gesture recognition device. It is very costly. In contrast, in the present invention, the electronic devices to be controlled are determined by the ambient information acquisition device 4. Multiple devices are controlled by only one gesture recognition device.

2. The Accuracy of Gesture Recognition is Greatly Improved.

a) In the prior art, a system of recognizing a gesture will shoot the picture from the camera deployed in the external environments or other perspectives. It is necessary to segment hand actions from the complex and noisy background, in order to reduce the false recognition rate. In the present invention, by arranging the main acquisition module below the palm and ensuring that it synchronously swings together with the palm, that is, by ensuring that the angle of view and the position of the main acquisition module are fixed relative to the palm, for a same gesture, this gesture is recognized by images captured from one fixed perspective. It is unnecessary to segment the hand from the background. Meanwhile, the recognition system has no computation cost for background deletion. b) In the prior art, the system of recognizing a gesture from images shot from external environments or other perspectives has to process the size scaling, rotation, distance adjustment and occlusion for the segmented gesture images. In the present design, the distance from the finger to the camera is constant, field of view is constant, and size scaling and rotation of the images is not required. Furthermore, there will be no large-area occlusion between the image sensor and hand, but in the prior art there is always occlusion between the camera and hand when the camera was deployed at the other perspective point.

c) For the system of recognizing a gesture from images taken from other perspectives, when the camera is used from other perspectives, it is required to recognize a same finger gesture from different angles and different illumination conditions. To realize this purpose, a large amount of data training is needed (the accuracy of recognition neural network is ensured only by training the recognition system with a large amount of images of a same gesture captured from different angles). For a same gesture, for example, holding the fingers straight and then closing them, when it is recognized by images shot from other perspectives, it is necessary to obtain photos from different angles within 360 degrees, so as to ensure the recognition accuracy of this action from each degree. In contrast, by the arrangement of the main acquisition module to the palm at a position adjacent to the wrist, photos are obtained from a fixed angle of view and fixed illumination conditions. For a same gesture, it is unnecessary to obtain photos from different angles within 360*360 degrees to train the recognition system. The amount of data for training can be greatly reduced, and the recognition accuracy can be greatly improved. This manifold processing step is eliminated.

d) Since the camera is arranged at the base of the palm and the maximum distance from the fingers to the camera is thus 15 to 20 cm, the resolution requirement of the image sensor can be reduced and the image data to be processed by the system can also be greatly reduced. In contrast, if the camera is deployed in other perspectives, due to a large distance from the fingers to the camera and the unfixed position, the resolution of the camera has to be increased to ensure that high-definition images of hand can be obtained at any position after segmentation. In current invention, tracking and auto-focusing is unnecessary, and the time of focusing is reduced. Meanwhile the requirement of FOV angle for the image sensor is also decreased. The calibration step for distortion of lens is also reduced.

e) The maximum distance from the fingers to the camera is 15 to 20 cm. Therefore, the power consumption for lighting at the minimum intensity required by the camera at 20 cm is greatly reduced. Without the interfering of ambient light, the accuracy for gesture recognition will increase.

f) acquisition module acquires posture data with camera and microphone. The recognition accuracy of gesture will increase by microphones that acquire sound of fingers' action when tapping or snapping. These microphones cling to the skin to acquire sound of fingers' action transmitted from the body tissue in order to avoid the other noise like speaking from the air.

3. The Recognition is Quickened.

The gesture recognition is required to be in real time. It will not be appreciated by users if it takes too much time to recognize a gesture.

It may be found from a) in 2 that it is necessary to segment hand from the images if there is a noisy background, in order to find out the position of the hand. It will always use a neuron network to finish this task. It is time consuming.

It may be found from b) in 2 that scaling the gesture images rotation adjustment also needs to recognize the parameters like scaling ratio and rotation angle. It is more time consuming.

It may be found from c) in 2 that more layers of neurons are required to recognize a finger posture from different angles than from a single angle. These neurons are used for the manifold learning and different illumination conditions. For a same finger posture, if it is recognized within a range of 1 degree, compared with recognition from a single angle, up to 129600 pictures captured from different angles are used for training. If it is recognized from a single angle, only one picture is enough for training. The number of neuron weights and layers can be greatly reduced and the computation is obviously quickened.

It may be found from d) in 2 that the reduction in the resolution of the camera leads to the pixels of the images to be significantly reduced and thus much less pixels to be processed. Compared with the use of a 0.0625 mega-pixel device, the use of a 5 mega-pixel device increases the number of pixels to be processed by almost 80 times. During the processing of convolutional neural networks, one picture is to be traversed by almost 20 kernels in one neural network by a single layer, the performance will be increased by 1600 times. There will be a plurality of layers in the deep neural networks and the performance will be further increased. Large FOV lens such as fisheye lens are unnecessary, the calibration computation for lens distortion is also unnecessary.

It may be found from f) in 2: the sound recognition for finger's action will decrease the frame rate of image gesture recognition.

4. The Power Consumption is Reduced.

The power consumption of the recognition system is related to the number of floating point operations (multiplication of neural network weights).

It may be found from a) in 2 that the images are segmented by the convolution neural network to filter the noisy background. It will result in high power consumption.

It may be found from b) in 2 that scaling and rotating the gesture images and getting these parameters also increase the number of non-linear weights of the convolutional neural networks, resulting in multifold power consumption.

It may be found from c) in 2 that manifold processing for imagers from a same gesture are reduced. The number of non-linear weights of the convolutional neural networks and the depth of neural networks are reduced.

It may be found from d) in 2 that pixels of the images are greatly reduced. Compared with the use of a 625 mega-pixel device, the use of a 5 mega-pixel device reduces the number of pixels to be processed in the single-layer convolutional neural network, and the performance will be increased by 1600 times (floating point operations). In the multi-layer deep neural networks, the performance will be multiplied. The power consumption is significantly reduced. It also can be inferred that without tracking and auto-focusing the algorithm for these steps is reduced. In gesture recognition from images of external environments, for example leapmotion, 80% of operations can be provided by the gesture recognition system itself and the remaining 20% operations are provided by the computer connected thereto via a USB. This method is impossible in wearable devices, because their battery is unable to provide the chips with enough power to obtain the computation results and also because the computation capabilities of the main chip of wearable devices will not be better than that of the computer. Only by the method of the invention, the real-time recognition can be realized in wearable devices.

It may be found from f) in 2: the sound recognition for fingers' action has lower calculation cost which could reduce the power consumption and image frame rate for recognition. For the frame rate decreasing, the power consumption of posture image recognition will decrease too.

5. Recognition can be Realized Anywhere.

When the camera is used in external environments or other perspectives, it is necessary to put the hand within the area where the image sensor is located. Even by the method as employed in hololens, it is also required to raise a person's arm to ensure that the camera on the hamlet can capture the hand. In contrast, by the method of the present invention, the hand may be sensed anywhere.

6. The Users are Protected Against Gorilla Arms.

Due to the advantage described in 5, it is unnecessary to raise a person's arm for a long period of time and put the hand in the area that can be recognized by the camera. This can avoid soreness of the arm (gorilla arm). This symptom is very common in users of iPad. The users are also protected against mouse hands (carpal tunnel syndrome). Additionally, suffering from the gorilla arms, the users may hold their handheld device at a low position, resulting in cervical spondylosis.

The foregoing descriptions are merely preferred embodiments of the present invention, and not intended to limit the present invention. Any modifications, equivalent replacements and improvements without departing from the spirit and principle of the present invention should be within the protection scope of the present invention.

What is claimed is:

1. A gesture acquisition system, comprising:
    a finger posture acquisition device (1), the finger posture acquisition device (1) comprising an image sensor (11) which is located at a base of a palm with an angle of view and a position of the image sensor being fixed relative to the palm and operably synchronously swing with the palm, the image sensor (11) being configured to acquire an image of a finger and part of the palm at the fixed angle of view relative to the finger and the palm, so as to acquire finger postures; and
    a wrist posture acquisition device (2) configured to acquire adduction-abduction postures of a wrist and flexion-extension postures of the wrist and a wristband (7) fixed on the forearm, the wrist posture acquisition device (2) comprising a wrist posture acquisition arm (22) that does an adduction-abduction motion and a flexion-extension motion together with the wrist and a sensing device (24) configured to acquire a flexion-extension angle and an adduction-abduction angle of the wrist posture acquisition arm (22), and the wrist posture acquisition arm (22) being connected to the wristband (7), and the wrist posture acquisition arm (22) doing an adduction-abduction motion and a flexion-extension motion together with the wrist by the wristband (7),
    wherein:
    the wrist posture acquisition arm (22) comprises an adduction-abduction arm (220) that does the adduction-abduction motion together with the wrist and a flexion-extension arm (222) that does the flexion-extension motion together with the wrist; and the sensing device (24) comprises two angle sensors that are, respectively, an adduction-abduction angle sensor (240) configured to acquire an adduction-abduction angle of the adduction-abduction arm (220) and a flexion-extension angle sensor (242) configured to acquire a flexion-extension angle of the flexion-extension arm (222); and
    the wristband (7) and an adduction-abduction axis of the wrist during adduction-abduction have two points of intersection which are corresponding to the adduction-abduction arm (220), and the wristband (7) and an flexion-extension axis of the wrist during flexion-extension have two points of intersection which are corresponding to the flexion-extension arm (222); each of the adduction-abduction arm (220) and the flexion-extension arm (222) has a fixed end and a free end opposite to the fixed end; the fixed end of one of the adduction-abduction arm (220) and the flexion-extension arm (222) is mounted on the wristband (7) and located at one of two corresponding points of intersection, with a corresponding angle sensor being mounted there, the flexion-extension angle sensor (242) being configured to sense the angle around flexion-extension axis and the adduction-abduction angle sensor (240) being configured to sense the angle of the angle around adduction-abduction axis, and the free end thereof is wound, along the wristband, to one of two points of intersection corresponding to the other one of the adduction-abduction arm (220) and the flexion-extension arm (222) and connected to the fixed end of the other one of the adduction-abduction arm (220) and the flexion-extension arm (222); a join point of the adduction-abduction arm (220) and the flexion-extension arm (222) has an included angle, with the other angle sensor being mounted there; the free end of the other one of the adduction-abduction arm (220) and the flexion-extension arm (222) is arranged around the wristband (7) and extended toward an outer side of the wristband (7) to be fixed on the wrist at a position adjacent to the hand.

2. The gesture acquisition system according to claim 1, wherein the free end, located on the wrist at a position adjacent to the hand, of the adduction-abduction arm (220) and the flexion-extension arm (222) is wound to the bottom of the wrist at a position adjacent to the hand, with the image sensor (11) being mounted there.

3. The gesture acquisition system according to claim 1, wherein the wrist posture acquisition arm (22) is a telescopic pole; the wrist posture acquisition arm (22) is connected to the wristband (7) and comprises one end located above or lateral to the wristband (7) and another end fixedly connected to the hand; the wrist posture acquisition arm (22) and the wristband (7) has a point of intersection located between two ends; one end is able to swing around the point of intersection; and the sensing device (24) acquires the flexion-extension angle and the adduction-abduction angle of the wrist posture acquisition arm (22) by acquiring swing information of the two ends.

4. The gesture acquisition system according to claim 3, wherein a fisheye bearing (75) is arranged on the wristband (7) or fixation structure (8) or both, and the wrist posture acquisition arm (22) is connected to them by running through the fisheye bearing (75).

5. The gesture acquisition system according to claim 4, wherein the sensing device (24) is a Hall sensor; a magnet (26) is arranged at the one end of the wrist posture acquisition arm (22); and the sensing device (24) acquires the flexion-extension angle and the adduction-abduction angle of the wrist posture acquisition arm (22) by acquiring magnetic field information at the one end or both.

6. The gesture acquisition system according to claim 3, further comprising a fixation structure (8) that is fixed on the wrist at a position adjacent to the hand, the one end of the wrist posture acquisition arm (22) being fixed on the fixation structure (8), the image sensor (11) being fixed on the fixation structure (8) or the wrist posture acquisition arm (22).

7. The gesture acquisition system according to claim 1, further comprising a forearm posture acquisition device (3) mounted on the wristband (7), the forearm posture acquisition device (3) being configured to acquire forearm postures, the forearm posture acquisition device comprising a three-axis gyroscope, a three-axis magnetometer and a three-axis acceleration sensor.

8. The gesture acquisition system according to claim 1, wherein the wristband (7) is shaped in a sleeve; a first fixation portion (71) and a second fixation portion (72) are arranged on the wristband (7) at interval; and the first fixation portion (71) and the second fixation portion (72) are matched with parts, protruded on the body skin, of styloid process of radius and styloid process of ulna to fixedly mount the wristband (7) on the wrist, respectively.

9. The gesture acquisition system according to claim 8, wherein the first fixation portion (71) and the second fixation portion (72) are through-holes or grooves formed on the wristband (7).

10. The gesture acquisition system according to claim 1, further comprising an ambient information acquisition device (4) configured to search for, in the ambient environment, electronic devices to be controlled.

11. The gesture acquisition system according to claim 10, the ambient information acquisition device (4) is camera which is configured to search for, in the ambient environment, electronic devices to be controlled.

12. The gesture acquisition system according to claim 1, wherein the image sensor (11) is camera.

13. The gesture acquisition system according to claim 1, wherein the image sensor (11) is mounted 3 cm away from the body skin.

14. The gesture acquisition system according to claim 1, further comprising a camera and a microphone (microphone arrays), wherein the camera is configured to acquire finger posture information by acquiring an image of the finger or acquiring position and orientation of hand or arm, and the microphone (microphone arrays) is configured to acquire sound of fingers' action when tapping or snapping.

15. The gesture acquisition system according to claim 14, wherein the camera is further configured to acquire a forearm posture.

* * * * *